(12) United States Patent
Morton

(10) Patent No.: US 10,356,330 B1
(45) Date of Patent: Jul. 16, 2019

(54) SMALL, RUGGED, COVERT OUTDOOR PTZ CAMERA WITH CONCENTRIC SQUARE, PAN-TILT MOVEMENT AND TRACKING PHOTO SENSORS

(71) Applicant: Steven Gregory Morton, Oxford, CT (US)

(72) Inventor: Steven Gregory Morton, Oxford, CT (US)

( * ) Notice: Subject to any disclaimer, the term of this patent is extended or adjusted under 35 U.S.C. 154(b) by 0 days.

(21) Appl. No.: 15/079,372

(22) Filed: Mar. 24, 2016

Related U.S. Application Data

(60) Provisional application No. 62/141,797, filed on Apr. 1, 2015.

(51) Int. Cl.
| | | |
|---|---|---|
| H04N 5/225 | (2006.01) | |
| G03B 17/00 | (2006.01) | |
| G03B 17/56 | (2006.01) | |
| H04N 5/232 | (2006.01) | |
| G02B 7/10 | (2006.01) | |

(52) U.S. Cl.
CPC ......... *H04N 5/23296* (2013.01); *G02B 7/102* (2013.01); *G03B 17/561* (2013.01); *H04N 5/2253* (2013.01); *H04N 5/2254* (2013.01)

(58) Field of Classification Search
CPC .. H04N 5/2253; H04N 5/2254; G03B 17/561; G02B 7/102
See application file for complete search history.

(56) References Cited

U.S. PATENT DOCUMENTS

| | | | | |
|---|---|---|---|---|
| 6,591,064 | B2* | 7/2003 | Higashiyama | G06K 9/00604 348/143 |
| 7,440,027 | B2* | 10/2008 | Weaver | F16M 11/123 348/151 |
| 2007/0041724 | A1* | 2/2007 | Araki | F16M 11/10 396/419 |
| 2009/0039734 | A1* | 2/2009 | Takahashi | H02N 2/0025 310/323.02 |
| 2011/0268433 | A1* | 11/2011 | Yim | H04N 5/232 396/427 |
| 2016/0077410 | A1* | 3/2016 | Lytle | G03B 17/561 348/211.2 |

* cited by examiner

Primary Examiner — Abdelaaziz Tissire

(57) ABSTRACT

A small, rugged, concentric square, forward-pivot, assembly with motorized pan and tilt, two-point suspension of pan and tilt axes, multiple photo-sensors, and capable of using lenses that are much larger than pinhole lenses, is provided. It is combined with a motorized zoom lens, image sensor, processor and enclosure to form a covert outdoor video surveillance camera. It enables a viewing window for the lens to be small yet provide large angles of view without needing a light-losing, dark material or sharpness-losing perforated media to conceal it, and captures much more light than a pinhole. Three photo sensors are arranged around the lens and collectively control an IR-cut filter. The sensors are integrated into the assembly to point in the same direction as the lens, and provide a good assessment of the scene brightness even when some of them have been panned or tilted out of view of the window.

13 Claims, 10 Drawing Sheets

SMALL, RUGGED, COVERT OUTDOOR PTZ CAMERA WITH CONCENTRIC SQUARE, PAN-TILT MOVEMENT AND TRACKING PHOTO SENSORS

CROSS-REFERENCE TO RELATED APPLICATION

This patent application claims the benefit of provisional patent application, "Forward-Pivot PTZ Camera with Tracking CdS Sensors," filed Apr. 1, 2015, application No. 62/141,797, by the inventor named herein.

DRAWINGS

FIG. 1. Front view of concentric-square, forward-pivot, pan-tilt assembly, bottom downward, according to this invention FIG. 2. Rear view of concentric-square, forward-pivot, pan-tilt assembly, bottom upward, according to this invention FIG. 3. Rear view of concentric-square, forward-pivot, pan-tilt assembly, bottom downward, showing holes for three photo sensors, according to this invention FIG. 4. Rear view of concentric-square, forward-pivot, pan-tilt assembly, bottom downward, with non-zero, pan and tilt angles, according to this invention FIG. 5. Front view of concentric-square, forward-pivot, pan-tilt assembly with three photo sensors, bottom upward, according to this invention FIG. 6. Rear view of concentric-square, forward-pivot, pan-tilt assembly with three wired photo sensors, and standoffs for image sensor board, according to this invention FIG. 7. Front view of concentric-square, forward-pivot, pan-tilt assembly with three photo sensors and motorized zoom lens, bottom downward, according to this invention FIG. 8. Rear view of concentric-square, forward-pivot, pan-tilt assembly with three wired photo sensors, image sensor board with three standoffs and motorized zoom lens (not visible in this view), and control board for zoom lens, according to this invention FIG. 9. Side view of rear of small, rugged, PTZ camera with concentric square, forward-pivot, pan-tilt assembly and tracking photo sensors, according to this invention FIG. 10. PRIOR ART. Drawing of forward-pivot, single-axis assembly for pinhole camera

DESCRIPTION

Field of the Invention

This invention relates to the design of covert outdoor video surveillance cameras with motorized, remotely controlled, pan, tilt and zoom.

BACKGROUND OF THE INVENTION

I made this invention after puzzling for five years over how to build a better outdoor, covert, pan, tilt, and zoom camera with mechanical, not digital, pan and tilt, and optical, not digital, zoom. I was aware of the prior art, single-axis, forward-pivot movement shown in FIG. 10, and the larger, two axis version, both for use primarily with a pinhole lens that is specially built for the purpose. I was unhappy with its need for a pinhole lens, not to mention one that is specially built for a particular forward pivot movement, use primarily indoors due to the need for a pinhole opening, its large gears and complex mechanism, the few choices of lenses, all of which were expensive, the lack of day/night capability, which requires a CdS photo sensor and a motorized IR-cut filter, and the tiny aperture and thus poor low light capability of a pinhole lens. I was aware of common pan-tilt mechanisms with their need for a large window and a single point of camera suspension for each axis. I was also aware of cameras with digital pan, tilt and zoom, which have orders of magnitude less resolution of a region of interest than a camera with mechanical pan and tilt, and optical zoom, simply because they can't be pointed mechanically under remote control in the direction of interest.

Outdoor cameras must be weatherproof. They require a means for the camera to view the world while keeping moisture and dirt out of the camera. Exposed domes cannot be used in covert applications because they scream, "camera here," defeating the purpose of having a camera, hence flat windows that are several inches across and coplanar with a wall of a rectangular enclosure are generally used. A tiny, e.g., pinhole aperture, along with a pinhole lens, is often used indoors but is not suitable outdoors because it allows the elements to get into the camera, and a small hole can become clogged easily by dirt and insects. A small flat window can be used in place of a pinhole, but windows cannot be arbitrarily small due to fabrication and optical issues, and the bigger the window, the less benefit is obtained from a pinhole lens. Using a larger lens, at the expense of a larger window, offers better performance and far more lens choices.

Outdoor cameras should also have remotely controlled, motorized, pan, tilt and zoom so they can be aimed from a distance. If the camera is used in a vehicle, or is to be moved from place to place for temporary applications, as is common in covet work, its pan and tilt movement needs to be rugged. However, most pan and tilt movements have 360-degree horizontal movement and 180-degree vertical movement, and only a single point of suspension for each camera axis and do not handle rough movement well.

SUMMARY OF THE INVENTION

My objective of this invention is to provide a better outdoor covert pan-tilt-zoom camera by:
1) making a smaller, motorized, pan-tilt mechanism, whose two pivot points, i.e., axes of rotation, are substantially forward of the lens, rather than near the image sensor
2) limiting pan and tilt movements to less than 180 degrees
3) having motorized optical zoom
4) being able to use a wide range of economical, off-the-shelf, motorized zoom lenses for high optical quality, suitable for use with high definition video and beyond, and many choices of focal lengths, and having much larger apertures than pinhole lenses for improved low light capability
5) suspending the camera from its image sensor board, not the lens, so the outer shell of the lens can rotate, if necessary, as the lens zooms and focuses, and to enable 100 many choices of economical image sensor boards to be used
6) having the ability to detect ambient light from the same direction the lens views as it pans and tilts, to control an IR-cut filter between the lens and the image sensor in the camera, to improve low light capability by removing the filter from the optical path in low light 7) being rugged, particularly the ability to handle vibration during transportation, such as in mobile applications using vehicles and when moving the camera from one temporary installation to another
8) having a viewing window for the camera that is small enough it does not need to be concealed by a light-losing dark material, or a sharpness-losing perforated media over it, yet be large enough to capture much more light than a pinhole aperture
9) using motors that do not consume much power, especially to hold a position when not being moved

BRIEF DESCRIPTION OF THE DRAWINGS

Note: For the reader's convenience, items in illustrations are numbered according to the figure they are first shown in. For example, item number xyz is first shown in Figure x.

DETAILED DESCRIPTION OF THE INVENTION

Implementation of the Preferred Embodiment

I describe particular materials, components and dimensions to give concrete examples and describe the typical size, but many materials, components, dimensions and control protocols can be used as one skilled in the art can see. I avoid repetition of "in the preferred embodiment."

Figure 1:
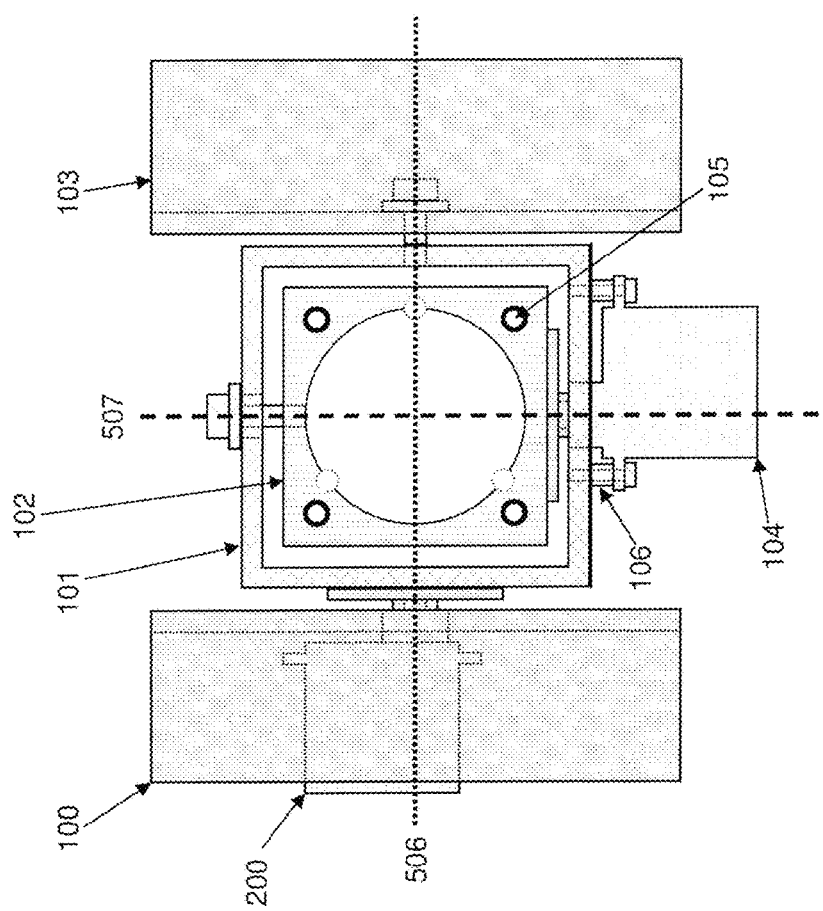
FIG. 1. This is a front view of my concentric-square, forward-pivot, pan-tilt assembly, with its bottom downward, according to this invention. By front view, I mean the side facing the street. By bottom downward, I mean the pan-tilt assembly is shown in the correct vertical orientation. Pan and tilt are at zero angles.

FIG. 1 shows a front view of my concentric-square, forward-pivot, pan-tilt assembly, with its bottom downward. By front view, I mean a view of the side of the assembly that faces the world and is fastened to the inside of the front cover, as 903 (not visible in this view), of an enclosure for the camera. This view is what someone outside the camera would see looking into the camera if the camera enclosure were see-through. By bottom downward, I mean the pan-tilt assembly is shown in the correct vertical orientation. Pan and tilt are shown at zero angles. The outside diameter of the front of the lens drives the dimensions of the entire assembly. I describe pan and tilt orientations in the preferred embodiment, but the whole assembly can be rotated as needed to best fit the camera enclosure used, changing which movements are pan and which are tilt.

The servo bracket, 100, and the bearing bracket, 103, are made from a 1"×1"×⅛" fiberglass angle that is 3" long. The servo bracket can be shorter; it just needs to be long enough to have a servo motor fastened to it. The bearing bracket can be much shorter since it just needs to hold a small bearing. The square tube, 101, is made from a 2" square by ⅛" thick fiberglass tube that is ⅝" long. The length of the square tube is long enough to allow the collar of the servo motor, 104, to be inserted through it without severing the wall of the tube. The servo motor, 104, can be mounted rotated 180 degrees about its axis if convenient to avoid mechanical interference with other components in the camera enclosure.

The inner bracket, 102, is 1.5" square. I made it from a ⅜" thick polycarbonate plastic sheet. It is slightly thicker than the outer diameter of the rear of the splined tube of the control horn, 504 (not visible in this view), for the servo motor, 104, the "pan" motor, that drives it so it does not sever the wall of the bracket. I used a Turnigy TGY-50090M "micro" servo motor in this example. The square tube, 101, and square inner bracket, 102, share a common center in the preferred embodiment, and hence are concentric squares. Other concentric shapes can be used, squares have the easiest fabrication from off-the-shelf materials in the absence of plastic injection molding or 3-D printing. Shapes with curved faces can also be used so corners of the brackets can move greater angles before striking the inside of the face of the camera enclosure; flat faces likewise have the easiest fabrication. The thickness and outer dimension of the inner bracket are chosen to allow any rotation of the inner bracket about its vertical axis within the square tube, and to be large enough to hold the control horn for the servo motor. The diameter, 1⅛", of the hole, 508 (not visible in this view), in the center of the inner bracket, 102, is slightly larger than the outside diameter of the front of the shell of the motorized zoom lens. The hole must be large enough to allow the lens to freely rotate about its long axis, either for assembly purposes or because some zoom lenses rotate part of their shell when changing focal length or focus.

The inner bracket has 3 mm, tapped through holes, such as 105, in its corners, with a countersunk hole on the outward side for a flat head machine screw. The placement and size of these holes matches the size and placement of the four corner mounting holes in the image sensor board, 801 (not visible in this view). An intermediate bracket or bent standoffs can be used between the inner bracket and the image sensor board if necessary to have different hole patterns or dimensions.

A servo motor, 104, the pan motor, is fastened to the square tube, 101, by a pair of screws and standoffs, as 106, and to the inner bracket, 102, by a control horn, 504 (not visible in this view), and small screws. It provides "pan," i.e., side to side, i.e., horizontal, movement of the camera. The length of the standoffs is chosen so the inner bracket, 102, is centered vertically in the square tube, 101.

The servo motor is zeroed as best as possible before being fastened to the inner bracket. The exact zero position varies from one motor, control horn and bracket to the next, due to the motor's shaft being splined, which quantizes its shaft rotation when being inserted into the control horn. I have software with parameters than more precisely set the servo motors in the finished assembly to the "zero" position. I define the "zero" position as the lens looking out the window orthogonal to the front cover of the camera enclosure, which holds the window. Since the window is mounted in the front cover, the window may not be exactly co-planar with the cover. I used a particular type of motor, a servo motor, and a particular make of motor are shown, as noted earlier, but many types and makes can be used. A servo motor is convenient because it has an internal potentiometer that defines and controls its angular position, rather than requiring an external switch and other circuitry to set limits of motion.

My software also allows me to define the limits of pan and tilt movement in an unsymmetrical fashion. The reason is that other components in a tightly packed camera enclosure may interfere with some angles of movement, and I want to limit power-wasting attempts to drive the pan-tilt assembly into positions that are not available.

Servo motors and remote controllers for them are widely used in radio-controlled aircraft, and I do not go into many details here. The signals and circuits to control them are likewise well known, so I do not describe them. Servo motors come in many sizes. Their ability to maintain their angular position when they are not being commanded to change it depends upon their strength and the torque placed upon them by their load. The "pan" motor, 104, has the least load and can be the smallest. "Micro" size servo motors are shown herein. The "tilt" motor, 200, bears a much greater load and can be larger. The same motor is shown herein for both pan and tilt. The choice of lens, which particularly affects the length of the structure, affects the choice of motors due to various torques being required.

The bearings used in the example herein are small flange bearings commonly used in radio controlled racing cars. Many types and sizes of bearings can be used, or for lowest cost, bearings can be avoided. I used ball bearings instead of sleeve bearings because ball bearings have lower resistance to being rotated, and longer life. I used bearings with a hole for a #4 screw, and mounted them with a #4 shoulder screw.

Figure 2:
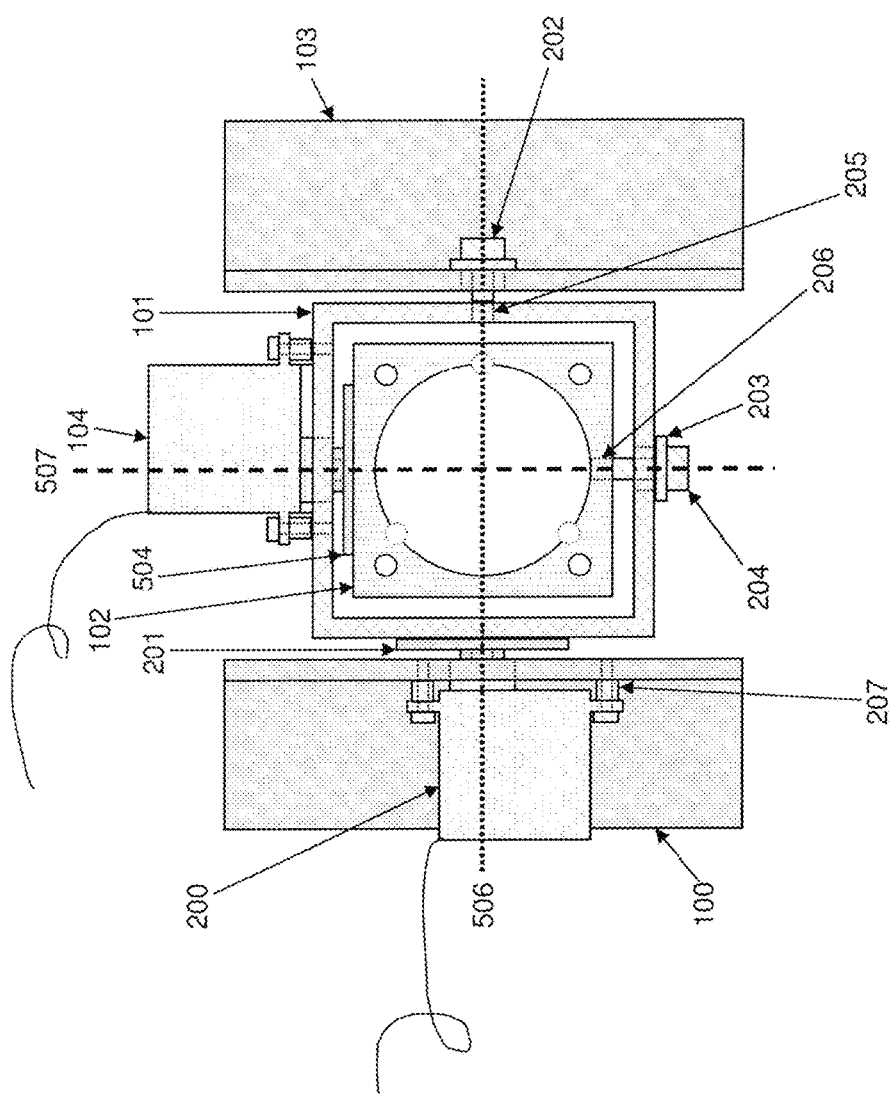
FIG. 2. This is a rear view of my concentric-square, forward-pivot, pan-tilt assembly, with its bottom upward, according to this invention. This view is obtained by rotating everything shown in FIG. 1 by 180 degrees about a central horizontal line, hence the bottom is upward. By rear view, I mean a view of the apparatus that faces inward, i.e., the part of the apparatus that faces the rear of the camera enclosure. Pan and tilt are at zero angles.

FIG. 2 shows the rear view of my concentric-square, forward-pivot, pan-tilt assembly, bottom upward. This view is obtained by rotating everything shown in FIG. 1 by 180 degrees about a horizontal line through the centers of the brackets 100 and 103, hence the bottom is upward. By rear view, I mean the view of the side of the assembly facing the rear of the camera enclosure, i.e., the view one could see if one could look into the back of the camera enclosure. Pan and tilt are at zero angles.

A second servo motor, 200, the "tilt" motor, provides "tilt" movement, which is up and down, i.e., vertical, movement of the camera. It is fastened to the servo bracket, 100, using screws and standoffs, as 207, like the pan motor, 104. It can be mounted on the bracket rotated 180 degrees about its axis if convenient to avoid mechanical interference with other components in the camera enclosure. It is fastened to the square tube, 101, by a control horn, 201, and screws, a common means of attaching the splined shaft of a servo motor to an object rotated by the motor. Splines prevent the motor shaft from rotating within the control horn, thus transferring the motor's torque to the load.

A threaded hole, 206, is in the center of a wall of the inner bracket, 102. It is inline with the axis of rotation of the pan motor, 104. A screw, 204, a shoulder screw in this example, passes through a ball bearing, 203, in a hole in the center of a wall in the square tube. The placement of this hole is dimension 911 in FIG. 9. The screw, 204, is screwed into a threaded hole, 206, in the inner bracket, 102. Thus both ends of the axis of rotation of the pan movement are supported, one by the "pan" motor, 104, and control horn, 504, and the other by the bearing, 203, and screw, 204.

Likewise, a second screw, 202, passes through a second bearing, 500 (not visible in this view), and is screwed into a threaded hole, 205, in the center of a wall of the square tube, inline with the axis of rotation of the tilt servo, 200. The vertical position of the center of the bearing, 500, in the bearing bracket, 103, is shown as 910 in FIG. 9, and is ⅜" in this example, thus driving the vertical position of the tilt servo, 200, in the servo bracket, 100.

Thus both ends of the axis of rotation of the tilt movement are supported, one by the "tilt" motor, 200, and control horn, 201, and the other by the bearing, 500, and screw, 202.

Other types of bearings and screws can be used.

For an outdoor camera to have the best sensitivity in low light, its IR-cut filter, which blocks near-infrared illumination during the day to give images like humans see, must be removed in low light. In low light, one is grateful to have any images, regardless of what a human would see. It is common in outdoor surveillance cameras for one CdS photo sensor to be exposed to the scene viewed by the camera, and to control a tiny motor that moves the camera's IR-cut filter into or out of the camera's optical path. The IR-cut filter is placed in the optical path of the image sensor of the camera when sufficient light is present, and removed from the optical path when there is not sufficient light. The details of such control are well known and are not recounted here. Suffice it to say that I want to control the IR-cut filter in my camera, with the complications that I want to conceal any photo sensors, have a small viewing window, and have have any photo sensors look in the same direction as the lens.

Figure 3:
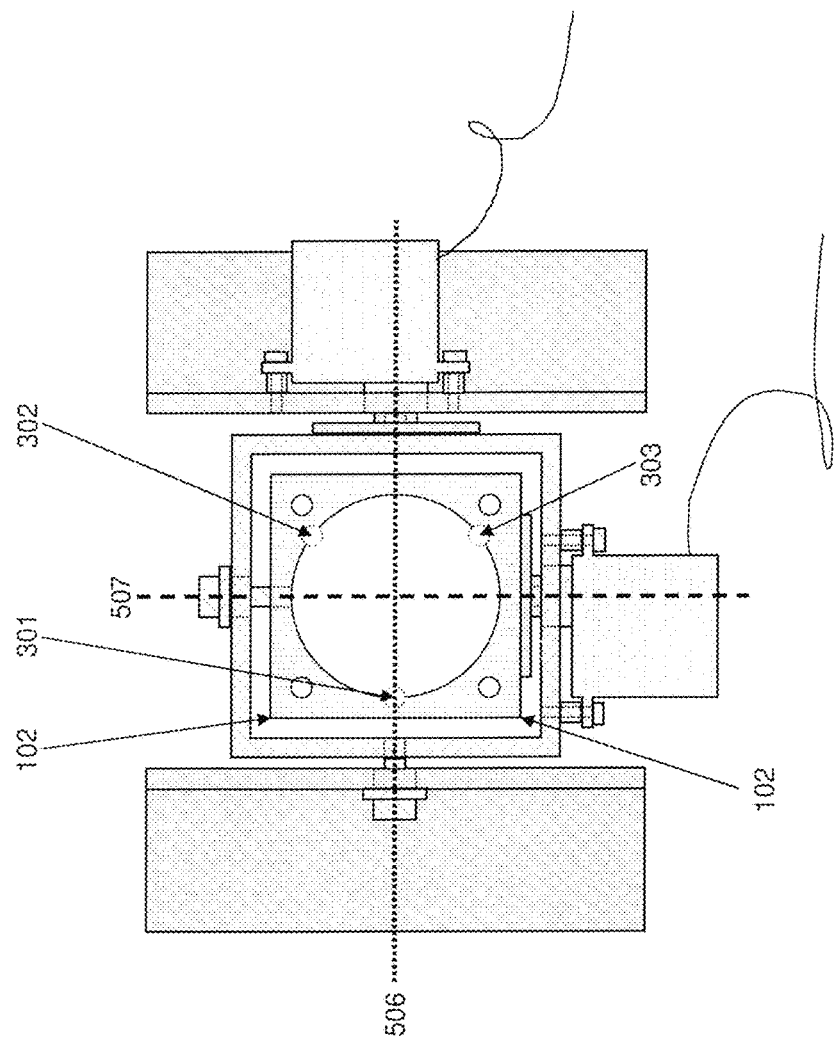
FIG. 3. This is the rear view of my concentric-square, forward-pivot, pan-tilt assembly, bottom downward, according to this invention. This is the normal preferred orientation when installed in a camera housing, but other orientations can be used. The assembly shown in FIG. 2 has been rotated 180 degrees about a line that is at orthogonal to the page. Pan and tilt are at zero angles.

FIG. 3 is the rear view of my concentric-square, forward-pivot, pan-tilt assembly, with its bottom downward. The assembly shown in FIG. 2 has been rotated 180 degrees about a line that is orthogonal to the page and through the center of the inner bracket, 102. Pan and tilt are at zero angles. Semi-circular holes, or passageways, 301, 302 and 303, in the inner bracket, 102, for three CdS photo sensors, 501, 502 and 503, are shown. They enable the wires for the CdS sensors to pass through the inner bracket and pass by the metal lens housing without touching it. The holes for the leads of the CdS sensors are evenly spaced around the large inner hole for the lens, with the hole, 301, in the thinnest part of the inner bracket being placed where there is no servo horn or shoulder screw; the two other holes, 302 and 303, being 120 degrees apart since there are three of them, are in thicker parts of the bracket. Rather than passing the leads of the CdS sensors through small holes in the inner bracket, and then soldering them to a circuit board, the holes are semi-circular so photo sensors can be mounted on a printed circuit board that is subsequently mounted on the rear of the inner bracket, and then the leads of the sensors bent into place into the holes.

I have chosen to have three small concealed CdS photo sensors, rather than the one overt CdS sensor found in other outdoor video surveillance cameras. The reason is that my camera views the world through a small circular window, 902, and the sensors are concealed and look in the same direction as the lens, so as to best assess the overall illumination seen by the camera. This window, 902, may be smaller than the outside diameter of the lens, 700. Two sensors are not enough because movement of the lens at right angles to a line through them could cause both to be blocked by the camera enclosure as a result of the small window. When the lens looks straight out the window, the three sensors receive about the same illumination, and being wired in parallel, appear to a control circuit as a single sensor.

The resistance change of a CdS sensor, in response to even small amounts of illumination, is so extreme, and the manufacturing variation in the nominal resistance of a CdS sensor is so wide, that three sensors wired in parallel appear as a single sensor. The resistance of a CdS sensor decreases as it receives more visible radiation. I wire three in parallel to provide an average value of their resistance. Were they wired in series, if one or two were dark because the lens has been panned or tilted so one or two CdS sensors cannot see through the window, a very high resistance would be obtained that is not indicative of the ambient illumination, and the IR-cut filter they control would be placed into a night condition erroneously.

I use CdS photo sensors to assess scene brightness instead of trying to obtain a reading from the image sensor because CdS spectral sensitivity is about that of the human eye, unlike a silicon image sensor, and an image sensor has its shutter speed and thus exposure, adjusted automatically, complicating the assessment of brightness. In addition, some lenses have electrically controlled irises that affect the amount of illumination reaching the image sensor, further complicating the assessment of brightness for the purpose of controlling an IR-cut filter.

Hence irises are generally controlled by a CdS sensor, which needs to look in the proper direction, as provided by this invention.

Figure 4:
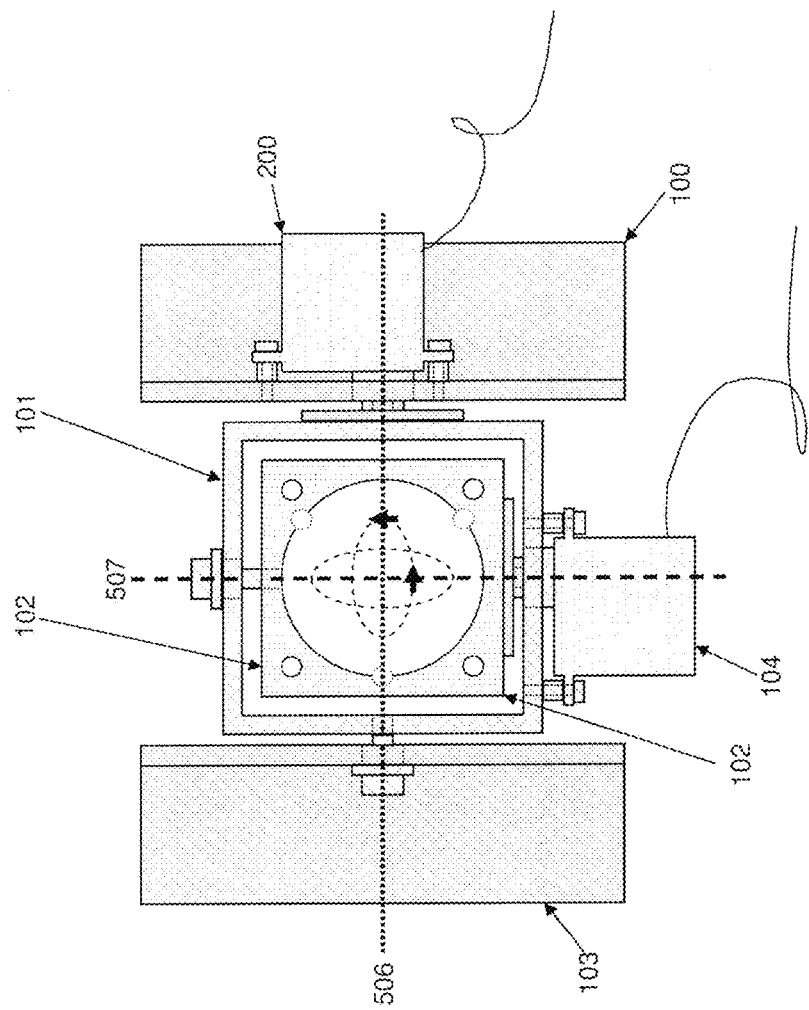
FIG. 4. This is a rear view of my concentric-square, forward-pivot, pan-tilt assembly, bottom downward, according to this invention. Pan and tilt have each been moved multiple degrees to show rotations of the structure.

FIG. 4 shows a rear view of my concentric-square, forward-pivot, pan-tilt assembly, with its bottom downward. Pan and tilt have each been moved multiple degrees to show rotations of the movable structure, i.e., rotation of the inner bracket, 102, with respect to the square tube, 101, and rotation of the square tube, 101, with respect to brackets 100 and 103, and thus with respect to the enclosure, 903 (not visible in this view), of the camera. The maximum desired amount of angular rotation of the inner bracket, 102, and the square tube, 101, affect the height of the bearing bracket, 103, and the servo bracket, 100, and the vertical placement (with respect to the mounting plane in the view shown) of servo motors and bearings in them. The maximum forward movement of the glass elements within the lens, 700, also affects the placement, since in some lenses, some optical elements stick out past the end of the lens shell for some zooms.

Figure 5:
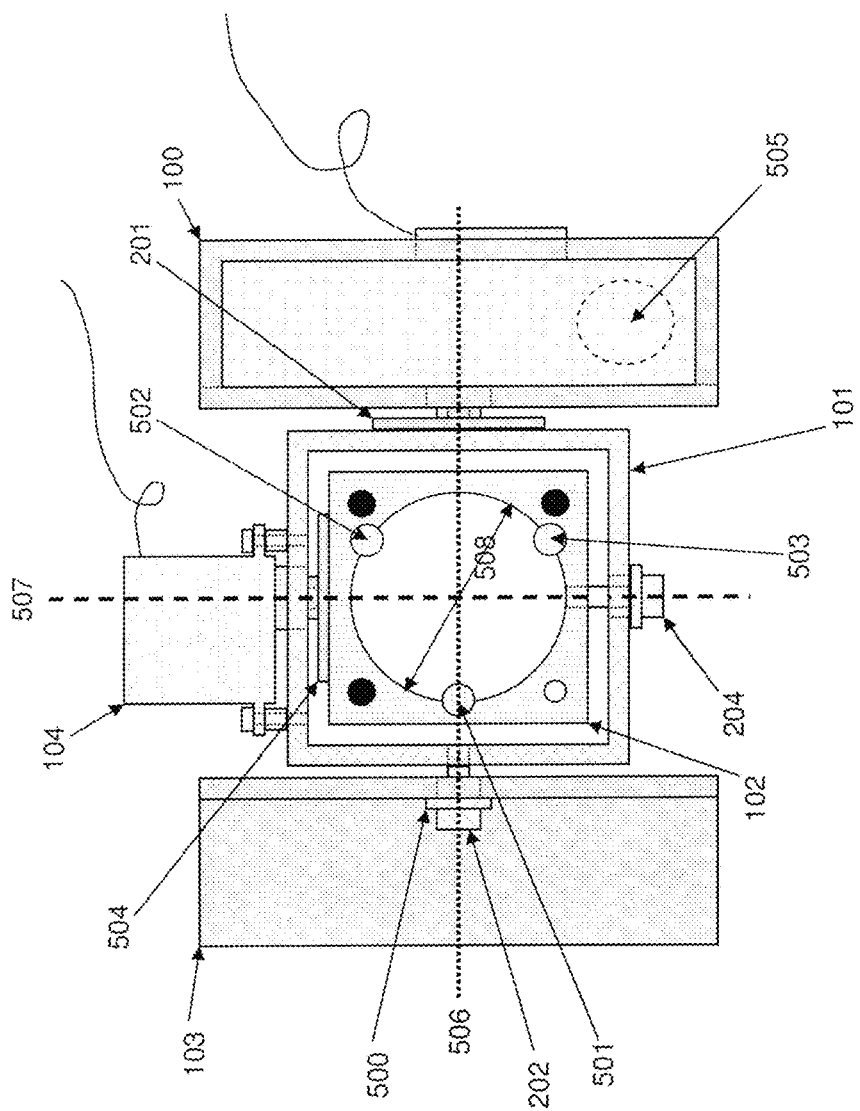
FIG. 5. This is a front view of my concentric-square, forward-pivot, pan-tilt assembly, bottom upward, showing the faces of three photo sensors, according to this invention. The left hand bracket, which is freely moving when the assembly is not mounted, rotated 180 degrees prior to this photo being made.

FIG. 5 shows a front view of my concentric-square, forward-pivot, pan-tilt assembly, with its bottom upward. Note that the bearing bracket, 103, rotates freely when not fastened to the camera enclosure and rotated 180 degrees prior to this photo being made, and is thus upside down in this figure.

Line 506 is the horizontal axis of rotation for the square tube, 101, "tilt" screw, 202, its bearing, 500, the "tilt" bearing, "tilt" control horn, 201, and "tilt" motor, 200 (not visible in this view). Line 507 is the vertical axis of rotation for the inner bracket, 102, "pan" motor, 104, "pan" control horn, 504, "pan" bearing, 203 (not visible in this view), and "pan" screw, 204.

An adjustable, heavy duty, Velcro-like fastener, 3M Dual-Lock (the thin version), is shown at 505 for fastening the servo bracket 100, to the inside of the front cover, 903 (not visible in this view), of the camera enclosure. This fastener is also used on the bearing bracket, 103. The inside front cover would also have this fastener. Other types of fasteners can also be used.

The concentric squares of the pan-tilt assembly are typically centered on the center of the window in the front cover of the camera enclosure. However, when a camera is mounted high on a utility pole, looking upward is much less useful than looking downward. The pan-tilt assembly can be placed above the center of the window to provide more downward movement than upward before the view is limited by the edges of the window. The upward and downward movements are thus non-symmetrical, and this is reflected in the data file that controls and limits lens movement.

Figure 6:
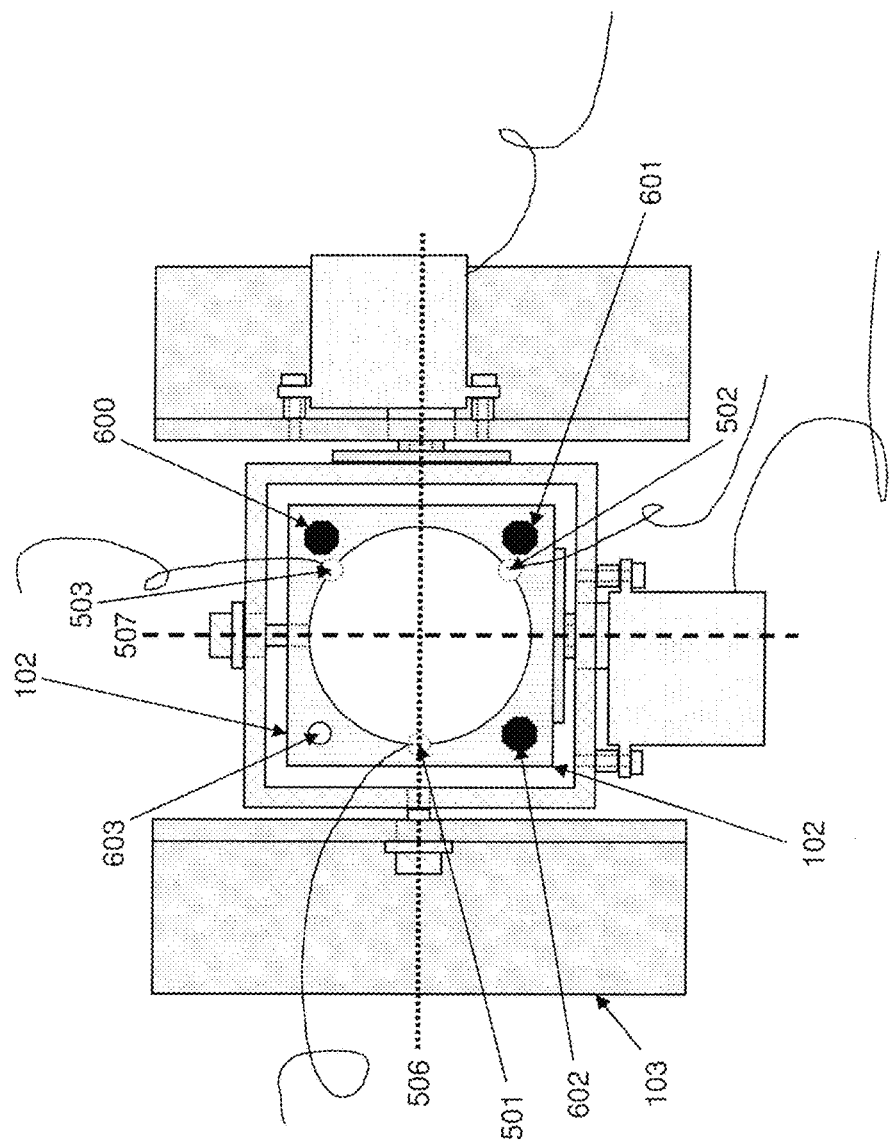
FIG. 6. This is a rear view of my concentric-square, forward-pivot, pan-tilt assembly, showing the rears of three photo sensors, which are wired in parallel, and three standoffs for an image sensor board, according to this invention.

FIG. 6 shows a rear view of my concentric-square, forward-pivot, pan-tilt assembly, with three standoffs, 600, 601 and 602, for an image sensor board, and three pairs of wires, 501, 502 and 503, for the CdS photo sensors. A standoff in one hole, 603, in one corner of the inner bracket is not used. These three pairs of wires can be replaced by a small printed circuit board mounted on the rear of the inner bracket, 102, and connects the sensors in parallel, with two wires being connected to a circuit board that controls the IR-cut filter. The standoffs, which are 40 mm long in this example, support an image sensor board (801, not visible in this view) with a lens (700, not visible in this view) attached to it. The lens is preferably a motorized zoom lens so it can be controlled remotely. Only two or three standoffs are typically used when, in an effort to minimize size of the pan-tilt assembly, there is mechanical interference from one or more motors on the lens when passing a standoff from the inner bracket, 102, to the image sensor board, 801.

Figure 7:
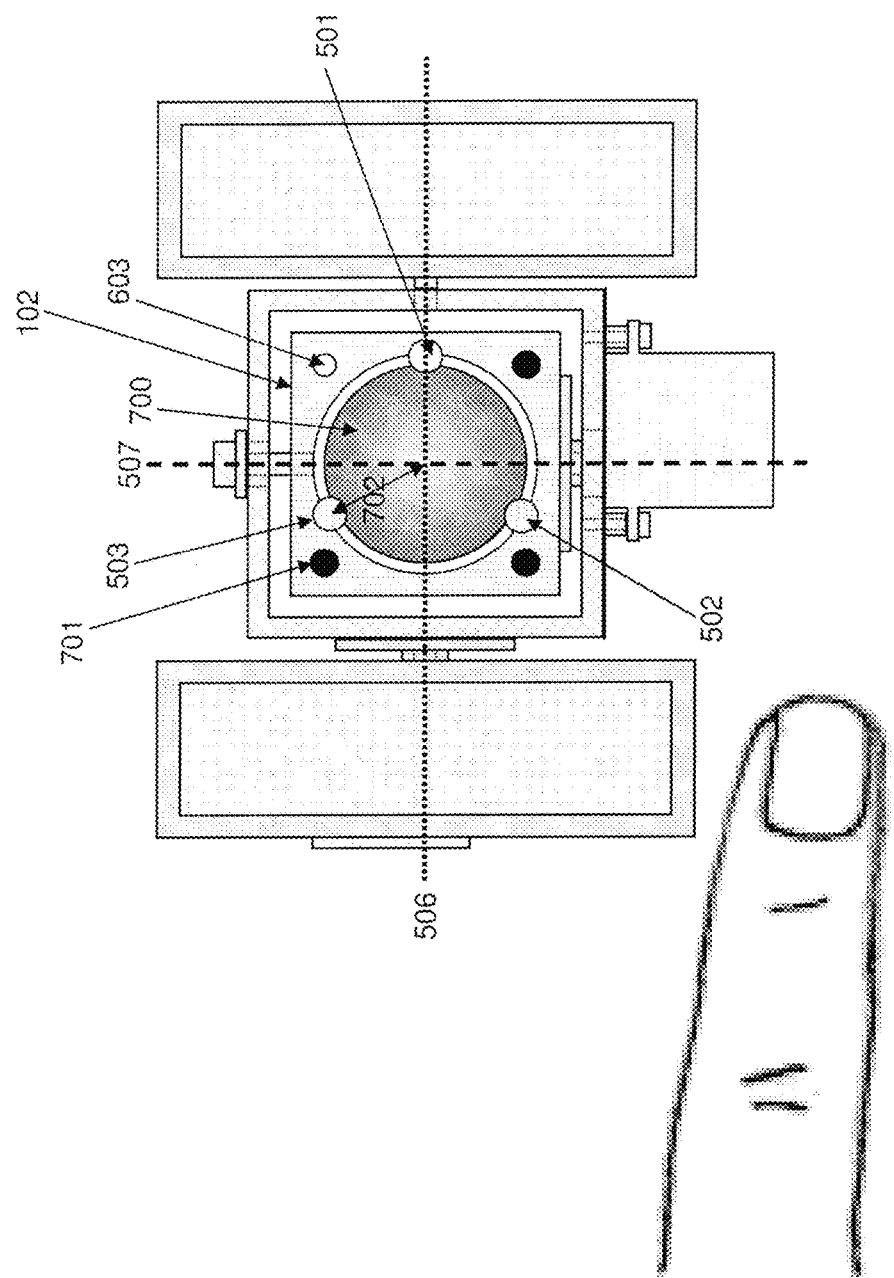
FIG. 7. This is a front view of my concentric-square, forward-pivot, pan-tilt assembly, bottom downward, showing the faces of three CdS (cadmium sulfide) photo sensors, a motorized zoom lens, and three bracket screws, according to this invention. A particular type of motor, a servo motor, and a particular make of servo motor are shown, but many types and makes of motors, lenses and photo sensors can be used. The fingers shown holding the small assembly give a sense of scale.

FIG. 7 shows a front view of my concentric-square, forward-pivot, pan-tilt assembly, bottom downward, the faces of three CdS sensors, 501, 502 and 503, three mounting screws, as 701, and a lens, 700. In the preferred embodiment, the front of the shell of the lens, 700, is co-planar with the front of the inner bracket, 102, and the rears of the photo sensors, 501, 502 and 503. This allows the sensors to be closer to the center of the lens to better view through a small window. In some zoom lenses, the glass optical elements move forward and backward when focal length and focus are changed, thus the sensors must not be so large or positioned so as to restrict this movement. An unused hole, 603, in the inner bracket is shown where, for the particular lens used in this example, a motor, 900 (not visible in this view), on the lens blocks one of the standoffs, for a particular angular orientation of the lens, i.e., for a particular rotation of the lens about an axis through its lens.

Note that the front of the lens, 700, is free to rotate. The lens is held only at its base and only by a lens holder, 901 (not visible in this view), that is fastened to the image sensor board, 801 (not visible in this view), by screws, 808 and 809 (not visible in this view). The image sensor board is held by screws, as 803, to standoffs, as 600, where the standoffs are fastened only to the inner bracket, 102, by screws, as 701.

The distance from the center of the lens, 700, to the center of a photo sensor, as 501, is shown as 702. I call twice this dimension, the diameter of the photo sensors, which is not necessarily the diameter, 508, of the hole in the center of the inner bracket, 102. With my more than two photo sensors that are spaced uniformly around the perimeter of the lens, the diameter of the window, 902, can be less than the diameter of the photo sensors. This is beneficial because the smaller the window diameter, the more covert the camera.

Also note that, in an effort to keep the structure small and able to use many off-the-shelf lenses, my structure is strong enough that it can be used with as few as two standoffs that are diagonally opposite one another. Many lenses have multiple motors, of different sizes and positions about the lens, that block the use of standoffs in each corner of the inner bracket and image sensor board. In addition, some lenses have threads for screwing into a lens holder, and initial focus depends upon a particular rotation of the lens in the holder. Since image sensors produce images with an up and down orientation, and lens holders likewise have particular orientations, it is not possible to rotate some lenses when fastening them to an image sensor board in a manner that enables use of four, or sometimes even three, standoffs, without increasing the size of at least part of the assembly. My invention allows use of a few as two standoffs to solve this problem.

One thing that can be handled in software to accommodate the mechanical installation of the lens is a 180-degree rotation of the images. I provide a configuration file that describes the lens orientation as up or down, and the processor that receives images from the image processor board reads that file and provides a 180-degree rotation of the video images when required.

In addition, in an effort to squeeze the combination of the pan-tilt assembly, lens and image sensor into as small an enclosure as possible, it is often convenient to rotate the lens a particular way when placing it in the lens holder, and to rotate the image sensor board with the lens attached, in a particular way, so as to avoid obstructions in the housing. This can be accommodated in my invention by a combination of choosing which standoffs to install, and choosing to rotate the images by 180-degrees or not.

Figure 8:
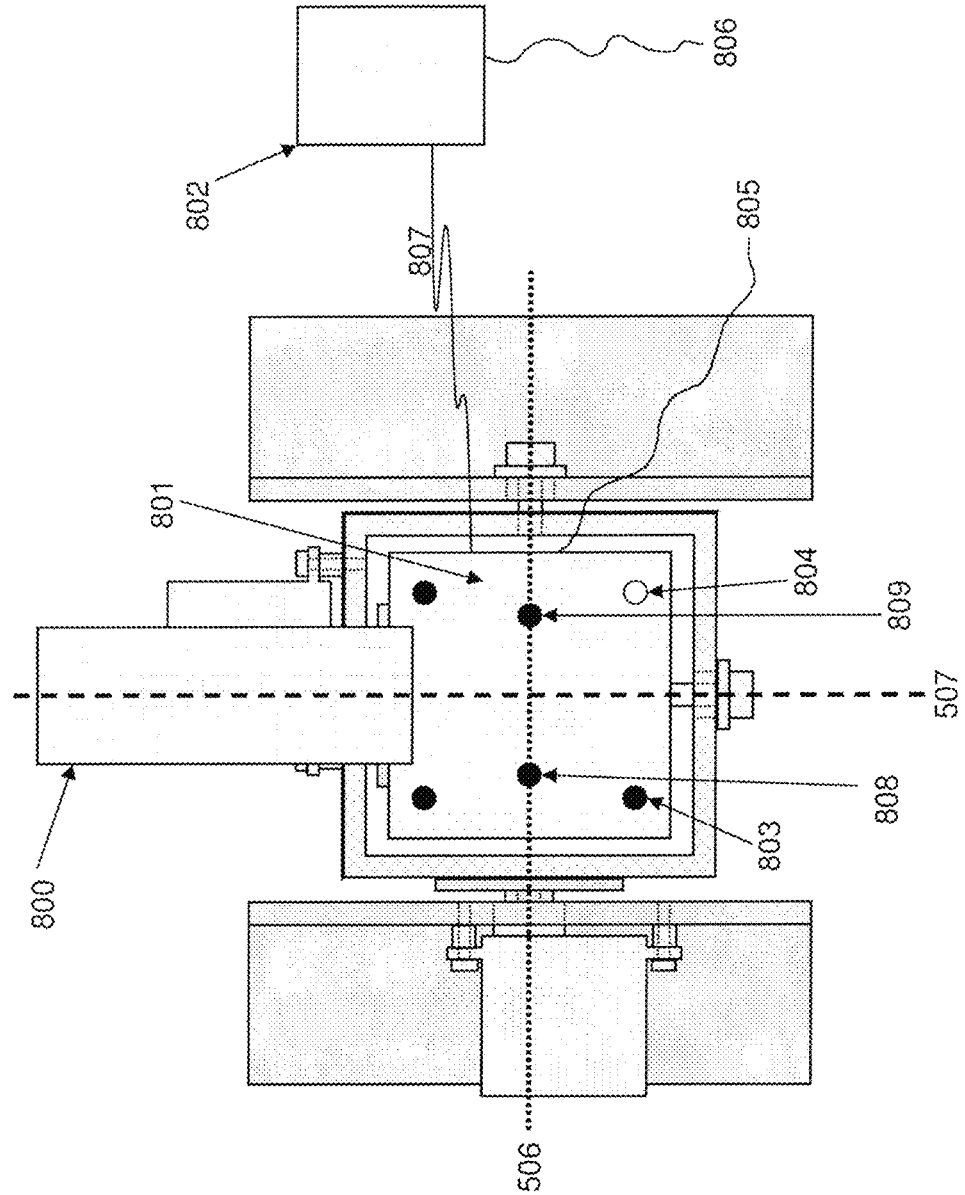
FIG. 8. This is a rear view of my concentric-square, forward-pivot, pan-tilt assembly showing an image sensor board with mounting screws for three standoffs, two mounting screws for a lens holder (not visible in this view), and a control board for a zoom lens, according to this invention. Other types of control boards can be used; the one shown receives RS-485 signals from a processor board (not shown), power from a power supply (not shown), has commands in the Pelco-D format, and controls the zoom lens (not visible in this view).

FIG. 8 shows a rear view of my concentric-square, forward-pivot, pan-tilt assembly, an image sensor board and a lens control board. An image sensor board, 801, is held by standoffs (not visible in this view), each standoff using a screw as 803 in a corner of the image sensor board. A flat cable, 800, connects the image sensor board, to a processor board, not shown. A lens control board, 802, is shown for the zoom lens. Other types of control boards can be used; the one shown receives RS-485 signals, PTZ commands in the common, Pelco-D format, and controls the zoom lens. A four-wire cable, 807, as is commonly used by small stepping motors on lenses, connects the lens control board, 802, to the motor, 900, on the lens, 700. A two-wire cable, 805, connects an motorized IR-cut filter, housed in 901 (not visible in this view), to a control board, not shown, that receives the signal from the three parallel-wired photo sensors. Two screws, 808 and 809, hold the lens holder, 901 (not visible in this view), on the side of the image sensor board that has an image sensor.

Some lenses have other arrangements of motors, aperture (iris) control, filters and holders than shown in the example herein, but the principles described herein still apply.

A Raspberry Pi Model B+ (not shown), along with a power supply, can be used as a processor board, but is not required. Its serial port can send signals to the lens control board, 802. A Raspberry Pi Camera Board with lens mount was used in this example as the image sensor board, but is not required. The open-source, Raspian Linux operating system software can be used, along with the raspivid software to acquire high definition video images from the image sensor on the image processor board, and convert them into H.264/MP4 video files, but is not required. Other video and multimedia file formats can be used. The open-source, servoblaster software can be used to control the servo motors along with the Pi-Pan Pan-Tilt Kit, with its servo control board, from mindsensors.com (non-patent citations #3), but is not required.

Figure 9:
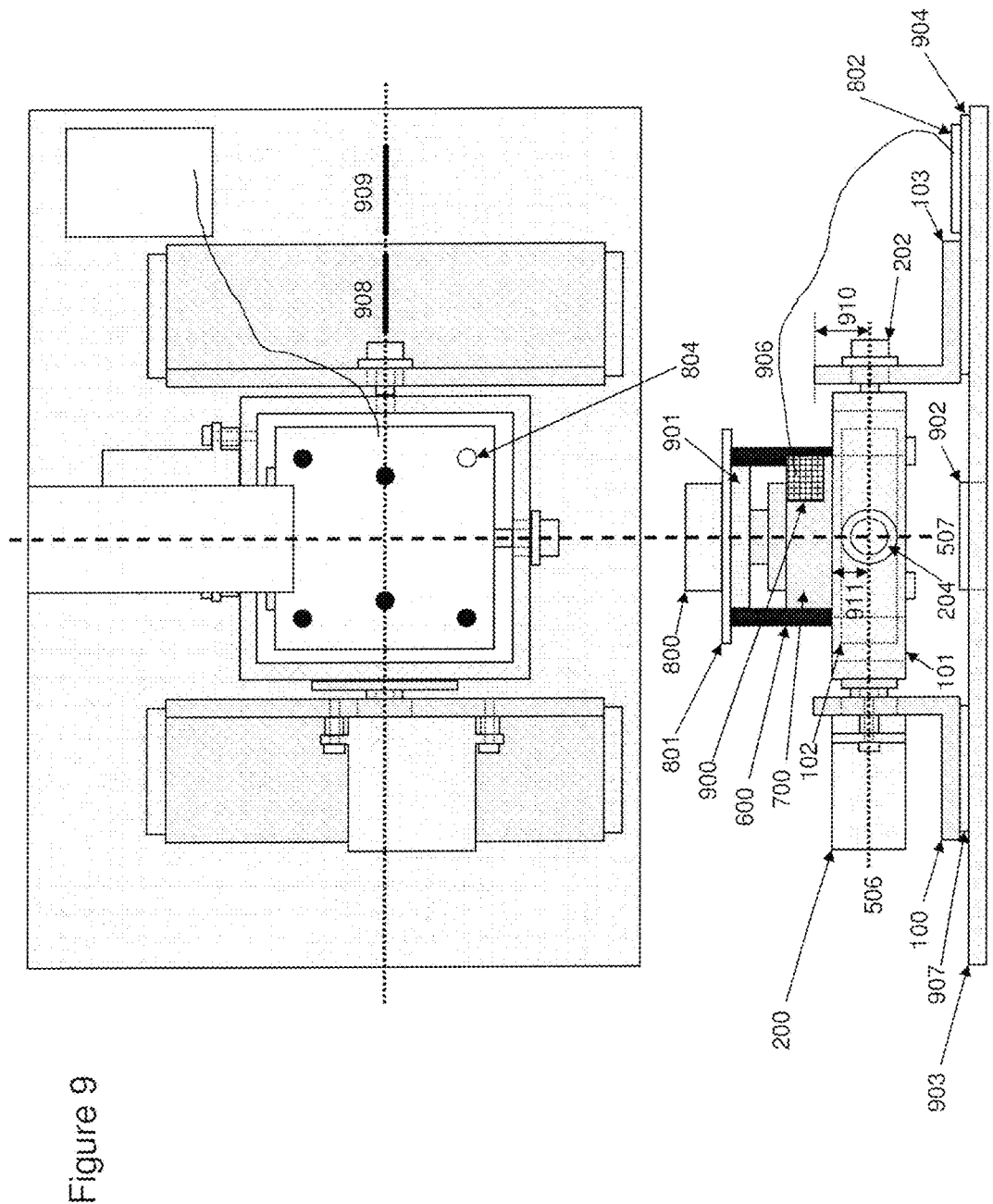
FIG. 9. This is a side view of the rear of my small, rugged, forward-pivot, concentric-square, PTZ camera with tracking photo sensors, according to this invention. It shows my forward-pivot, pan-tilt assembly, standoffs on fewer than four corners of the image sensor board, a motorized zoom lens, a motorized IR-cut filter, which doubles as a mounting bracket for the lens, an image sensor board, and a control board for the zoom lens.
Figure 10:
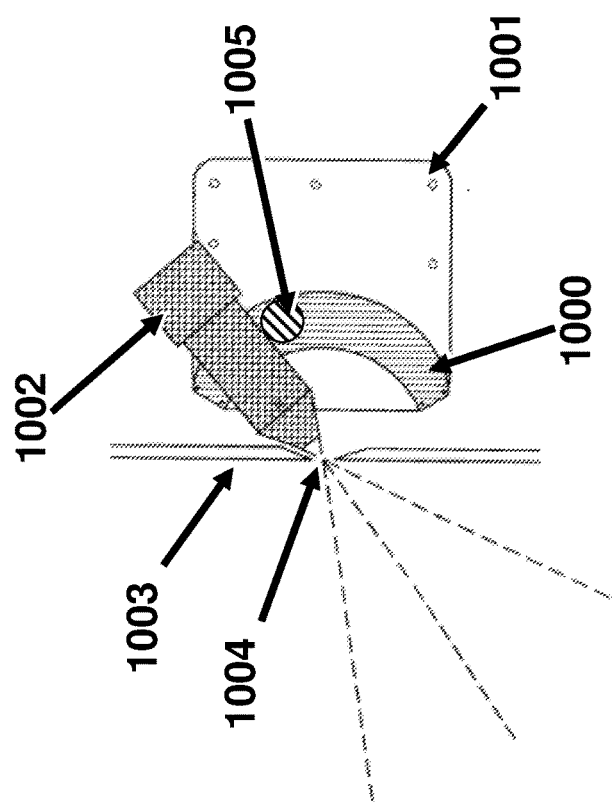
FIG. 10. PRIOR ART. This is a drawing of a single-axis, forward-pivot, assembly for a pinhole camera. A mounting plate, 1001, holds a large, semicircular gear, 1000. A motor, 1005, is fastened to a pinhole lens, 1002, and moves the lens vertically in an arc. The tip, 1004, of the lens looks through a small opening in a wall, 1003. A line orthogonal to the page, at the opening in the wall, is the axis of rotation. The plate, 1001, is typically 4×4.5 inches. The curved gear, or a groove (not shown) in the plate, holds the lens and motor assembly against the plate but allows it to move. A drawing similar to this one was obtained at: http://www.marshall-usa.com/optical/lenses/pinhole/pan-tilt.php.

FIG. 9 shows a side view of the rear of my small, rugged, forward-pivot, concentric-square, PTZ camera with tracking photo sensors. It shows my forward-pivot, pan-tilt assembly, an image sensor board, 801, standoffs, as 600, on fewer than all corners of the image sensor board, that connect the image sensor board to the inner bracket, 102 (not visible in this view), a motorized zoom lens, 700, with protruding motor, 900, a motorized IR-cut filter, 901, which doubles as a mounting bracket for the lens, wires, 906, for the three, parallel-wired photo sensors and IR-cut filter, a lens control board, 802, and a cable, 800, from the image sensor board to a processor board. Many types of processor boards, lens control boards, lenses, lens mounts, motorized IR-cut filters and control protocols can be used.

An example of the camera enclosure, flat front cover, 903, is shown, with its small window, 902, partly visible. The Velcro-like, re-positional fasteners, 904 and 907, that fasten to the bearing bracket, 103, and the servo bracket, 100, are shown. Other fasteners can be used.

At least one of the mounting holes, 804, in the image sensor board, 801, is not used with a 495 standoff, as 600, to connect the image sensor board to the inner bracket, 102, because the stepper motor, 900, in this example lens, with the angular orientation shown, is in the way. My assembly is strong enough and rigid enough to operate with as few as two standoffs in opposite corners of the inner bracket, 102 (not visible in this view).

Reference lines, 908 and 909, are shown for aligning the horizontal, tilt axis through the screw, 202, with an imaginary horizontal line through the vertical center of the small window, 902. Similarly, the vertical, pan axis through the screw, 204, is aligned with an imaginary vertical line through the horizontal center of the small window, 902. The vertical position of the pan-tilt assembly can be adjusted, as described earlier herein, to provide more downward viewing than upward, for example.

A bundle of cables, 906, consisting of signals to the IR-cut filter and signals from the photo sensors, along with power and signals for the two stepper motors, and power and signals for the lens control board, goes to a processor board and power supply. Other lenses may have other numbers of motors and control signals, but the principle of operation of my camera is the same.

PATENT CITATIONS

None.

NON-PATENT CITATIONS 1. (USA) V-ZPT2/V-ZPT4 High Tech Zoom Pinhole Lenses, http://www.marshall-usa.com/optical/lenses/pinhole/pan-tilt.php, and http://www.marshall-usa.com/optical/lenses/pinhole/pdf/p31.pdf
2. (England) Sonic Communications, Pan and Tilt, H2003 12v Forward Pivot Pan & Tilt unit, H2002 12v Miniature Forward Pivot Pan & Tilt unit, http://www.sonic-com-ms.com/index.php/technical-surveillance/pan-tilt
3) http://www.mindsensors.com/rpi/33-pi-pan, Pi-Pan, a Pan-Tilt Kit for Raspberry Pi Camera

I claim:

1. Apparatus for panning and tilting a device, comprising:
   a) a left bracket and a right bracket facing one another, parallel to one another, placed a distance apart with their long dimensions vertically oriented, and fastened to a mounting plate,
   b) a first motor fastened to the left side of the left bracket, with a shaft of the motor passing through a hole in the left bracket,
   c) a first bearing passing through a hole in the right bracket, where the left and right brackets, first motor and first bearing are fabricated, and positioned on the plate, so the axis of the first bearing is the axis, the tilt axis, of the shaft of the first motor,
   d) a hollow tube positioned between the left and right brackets, with the axis of the tube orthogonal to the mounting plate, with left, right, top and bottom reference points spaced equally around the perimeter of the tube and positioned vertically at half the height of the tube,
   e) a second motor fastened to the outside of the lower wall of the tube, at the bottom reference point, with the shaft of the motor passing through a hole in the tube,
   f) a means for connecting the shaft of the first motor to the tube at the location of the left reference point, such that rotation of the shaft of the first motor causes the same rotation of the tube,
   g) a threaded hole at the right reference point on the tube, the hole having the same axis as the axis of the shaft of the first motor, and receiving a first screw, through the center of the first bearing,
   h) a second bearing passing through a hole in the tube, centered on the top reference point of the tube,
   i) a substantially flat, inner bracket, centered inside and concentric with, the tube, able to support a device being panned and tilted, and able to rotate freely about its vertical axis, the pan axis, within the tube, and having top and bottom walls at right angles to its substantially flat, outward face and inward face, the outward face facing the plate,
   j) a means for connecting the shaft of the second motor to the center of the bottom wall of the inner bracket, such that rotation of the shaft of the second motor causes the same rotation of the inner bracket, and
   k) a threaded hole in the center of the top wall of the inner bracket, the hole having the same axis as the axis of the shaft of the second motor, receiving a second screw, through the second bearing.

2. Apparatus as described in claim 1, where additionally:
   a) the mounting plate has a window concentric with the inner bracket,
   b) the inner bracket has holes for fastening an image sensor board to it via standoffs that are mounted on its inward face,
   c) standoffs are fastened to the inner bracket,
   d) the image sensor board has an image sensor, and a lens holder for mounting a lens on the board,
   e) a lens is fastened in the lens holder,
   f) the inner bracket has a hole through the center of its faces, the hole being concentric with the hollow tube, where the hole is slightly larger than the front of the lens,
   g) the image sensor board is fastened to the standoffs, with the lens passing into the inner bracket from its inward side, placing the pan and tilt axes forward of the image sensor board and most of the lens, and able to see out the window, and
   h) the image sensor in the image sensor board, with its lens, can see out the window.

3. Apparatus as described in claim 2, where additionally:
   a) the inner bracket has passageways for passing the leads of at least three photo detectors through it, where the passageways are equally spaced around the hole for the lens, and
   b) the photo detectors view in the same direction as the lens.

4. Apparatus as described in claim 3, where:
   a) the rear side of each photo detector rests on the outward face of the inner bracket,
   b) the front of the lens does not extend beyond the outward face of the inner bracket, and
   c) the photo detectors overlap the front of the lens, moving their photo sensitive areas toward the center of the lens but not interfering with the field of view of the image sensor.

5. Apparatus as described in claim 3, where the tube is square.

6. Apparatus as described in claim 5, where the inner bracket is square.

7. Apparatus as described in claim 6, where the motors are servo motors.

8. Apparatus as described in claim 7, where the lens is a motorized zoom lens.

9. Apparatus as described in claim 8, where additionally:
   a) the lens has a motorized IR-cut filter, providing day and night modes of operation,
   b) the photo detectors are wired in parallel, and
   c) the combined output of the photo detectors controls the IR-cut filter.

10. Apparatus as described in claim 9, where the diameter of the window is less than or equal to twice the distance of the center of any photo detector from the center of the lens.

11. Apparatus as described in claim 9, where at least one of the photo detectors measures the amount of ambient light during daylight hours even when the pan and tilt assembly is panned and tilted sufficiently to obscure the view of one or more but not all of the photo detectors, and the motorized IR-cut filter is able to be correctly set into the mode for daylight operation.

12. Apparatus as described in claim 1, where additionally:
 a) the motors are servo motors, which move under command to angular coordinates built into the motors, and have zero positions that are not ideal,
 b) a processor is provided that can store data files and programs, execute programs, control the servo motors, and receive remote commands to move the apparatus,
 c) a data file is provided that specifies the coordinates required to set the motors to ideal initial angular positions of the apparatus, and
 d) the processor executes a program that reads the data file and moves the motors to ideal initial positions, and makes movements with respect to those ideal positions.

13. Apparatus as described in claim 12, where additionally:
 a) a data file has values that are the minimum and maximum horizontal coordinates,
 b) a data file has values that are the minimum and maximum vertical coordinates, and
 c) the processor executes a program that reads the data file and will not allow the motors to move the assembly beyond their maximum and minimum coordinates when it receives commands to move the apparatus.

\* \* \* \* \*